US009684577B2

(12) United States Patent
Ishii

(10) Patent No.: US 9,684,577 B2
(45) Date of Patent: Jun. 20, 2017

(54) SHARED STORAGE SYSTEM AND METHOD FOR CONTROLLING ACCESS TO STORAGE DEVICE

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kimiaki Ishii, Tokyo (JP)

(73) Assignees: Kabushiki Kaisha Toshiba, Tokyo (JP); Toshiba Solutions Corporation, Kawasaki-shi (JP)

( * ) Notice: Subject to any disclaimer, the term of this patent is extended or adjusted under 35 U.S.C. 154(b) by 367 days.

(21) Appl. No.: 14/608,247

(22) Filed: Jan. 29, 2015

(65) Prior Publication Data

US 2015/0363284 A1    Dec. 17, 2015

Related U.S. Application Data

(63) Continuation of application No. PCT/JP2014/065471, filed on Jun. 11, 2014.

(51) Int. Cl.
*G06F 3/06* (2006.01)
*G06F 11/14* (2006.01)
(Continued)

(52) U.S. Cl.
CPC ........ *G06F 11/2064* (2013.01); *G06F 3/0604* (2013.01); *G06F 3/067* (2013.01);
(Continued)

(58) Field of Classification Search
CPC .. G06F 11/2064; G06F 3/0604; G06F 3/0629; G06F 3/067; G06F 11/2058;
(Continued)

(56) References Cited

U.S. PATENT DOCUMENTS

2009/0313503 A1* 12/2009 Atluri ................. G06F 11/1453
714/19
2011/0231624 A1   9/2011 Fukutomi et al.
2013/0297900 A1  11/2013 Fukutomi et al.

FOREIGN PATENT DOCUMENTS

JP       2010-231690        10/2010
JP       2010-233190        10/2010
(Continued)

*Primary Examiner* — Zhuo Li
(74) *Attorney, Agent, or Firm* — Finnegan, Henderson, Farabow, Garrett & Dunner, L.L.P.

(57) ABSTRACT

According to one embodiment, a shared storage system includes a plurality of host servers, a plurality of storage devices, and a management server. The management server manages each of a plurality of logical units using first address management information, and manages a revision of the first address management information using first revision data. The host servers each hold respective copies of the first address management information and first revision data. When a first host server has requested a first storage device to execute access, based on a copy (second revision data) of the first revision data, the first storage device executes the requested access on condition that the second revision data coincides with revision data notified by the management server.

16 Claims, 10 Drawing Sheets

(51) Int. Cl.
*G06F 11/20* (2006.01)
*H04L 29/08* (2006.01)

(52) U.S. Cl.
CPC ........ *G06F 3/0629* (2013.01); *G06F 11/1451* (2013.01); *G06F 11/1464* (2013.01); *G06F 11/2058* (2013.01); *G06F 2201/84* (2013.01); *G06F 2201/855* (2013.01); *H04L 67/1097* (2013.01)

(58) Field of Classification Search
CPC ............. G06F 11/1451; G06F 11/1464; G06F 2201/855; G06F 2201/84; G06F 3/0611; G06F 3/0688; G06F 12/00; G06F 12/0246; G06F 12/16; G06F 2212/7205; G06F 3/0608; G06F 3/064; G06F 3/0644; G06F 3/0665; G06F 3/0616; G06F 3/0631; G06F 3/0641; H04L 67/1097
See application file for complete search history.

(56) References Cited

FOREIGN PATENT DOCUMENTS

| | | |
|---|---|---|
| JP | 2011-197945 | 10/2011 |
| WO | WO 2010/116434 | 10/2010 |

\* cited by examiner

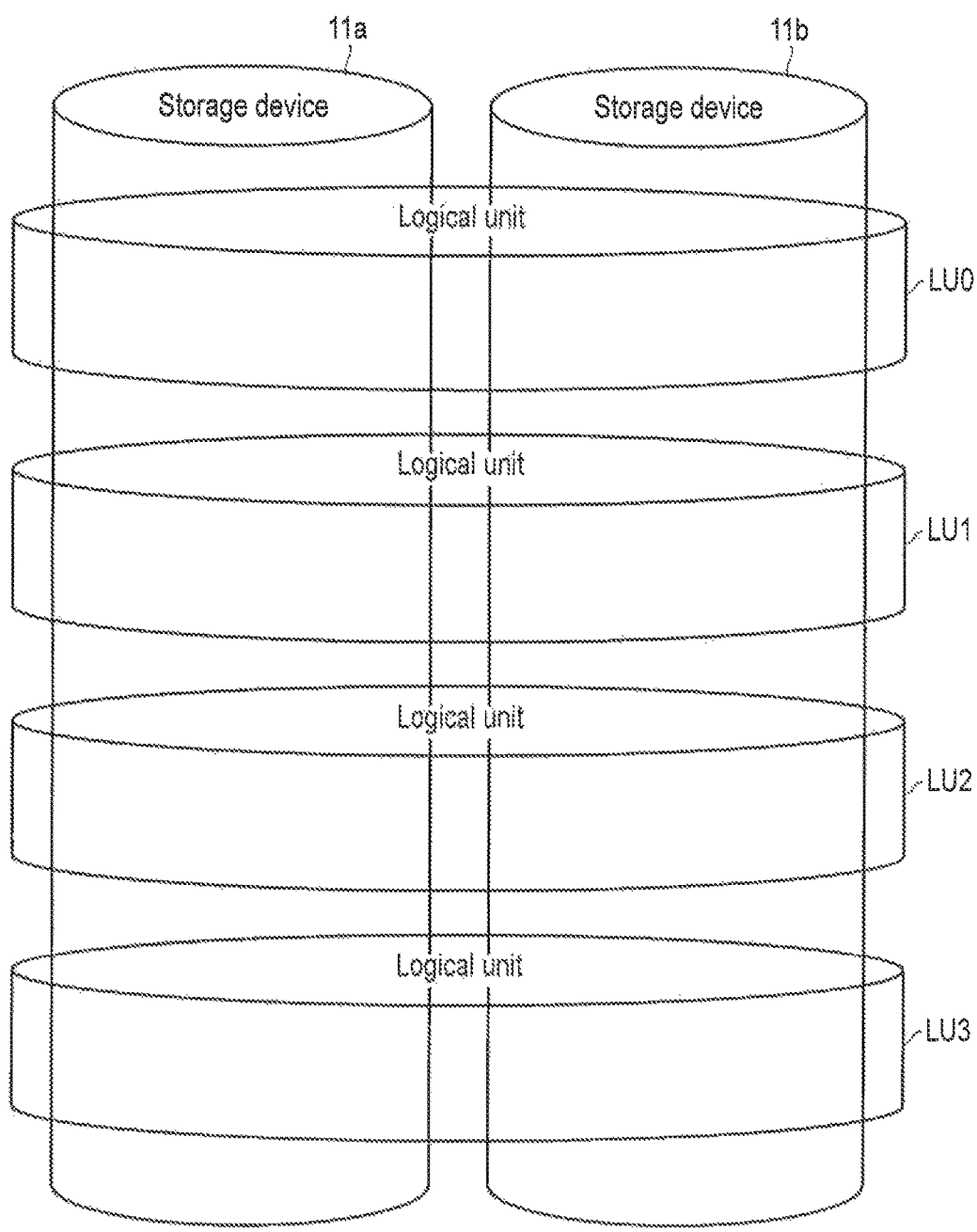
F I G. 2

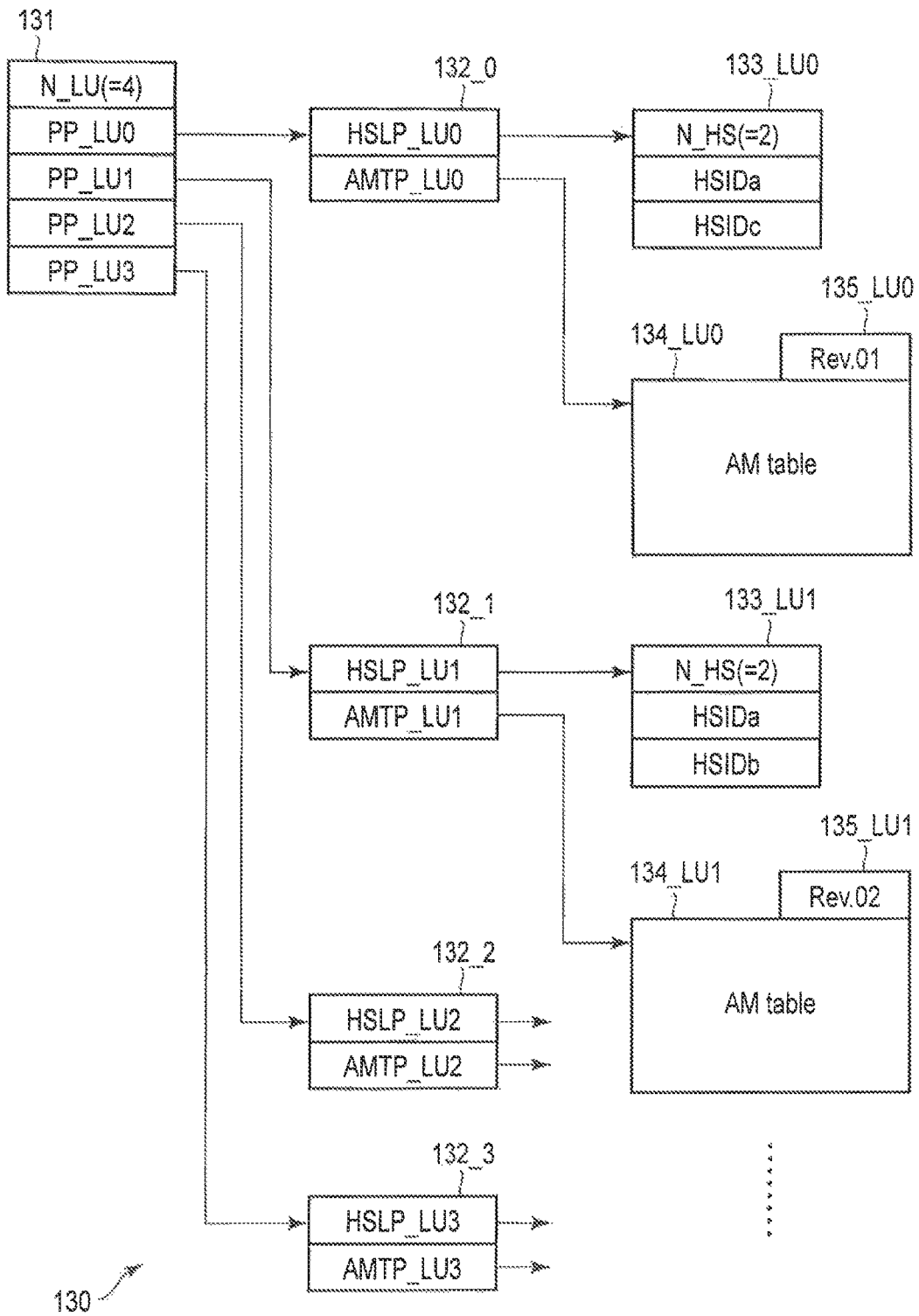
F I G. 3

134_LUi

| LUN | Virtual block address | Storage ID | Real block address |
|---|---|---|---|
| LUi | VBA0 | SIDa | RBA0 |
| LUi | VBA1 | SIDa | RBA1 |
| LUi | VBA2 | SIDa | RBA2 |
| ⋮ | ⋮ | ⋮ | ⋮ |

FIG. 5

| Group code | Command code |
|---|---|
| LUN | (Reserved) |
| Real block address | |
| Real block address | |
| Real block address | |
| Real block address | |
| (Reserved) | |
| Transfer data length | |
| Transfer data length | |
| RN of AM table | |
| RN of AM table | |
| Control byte | |

FIG. 6

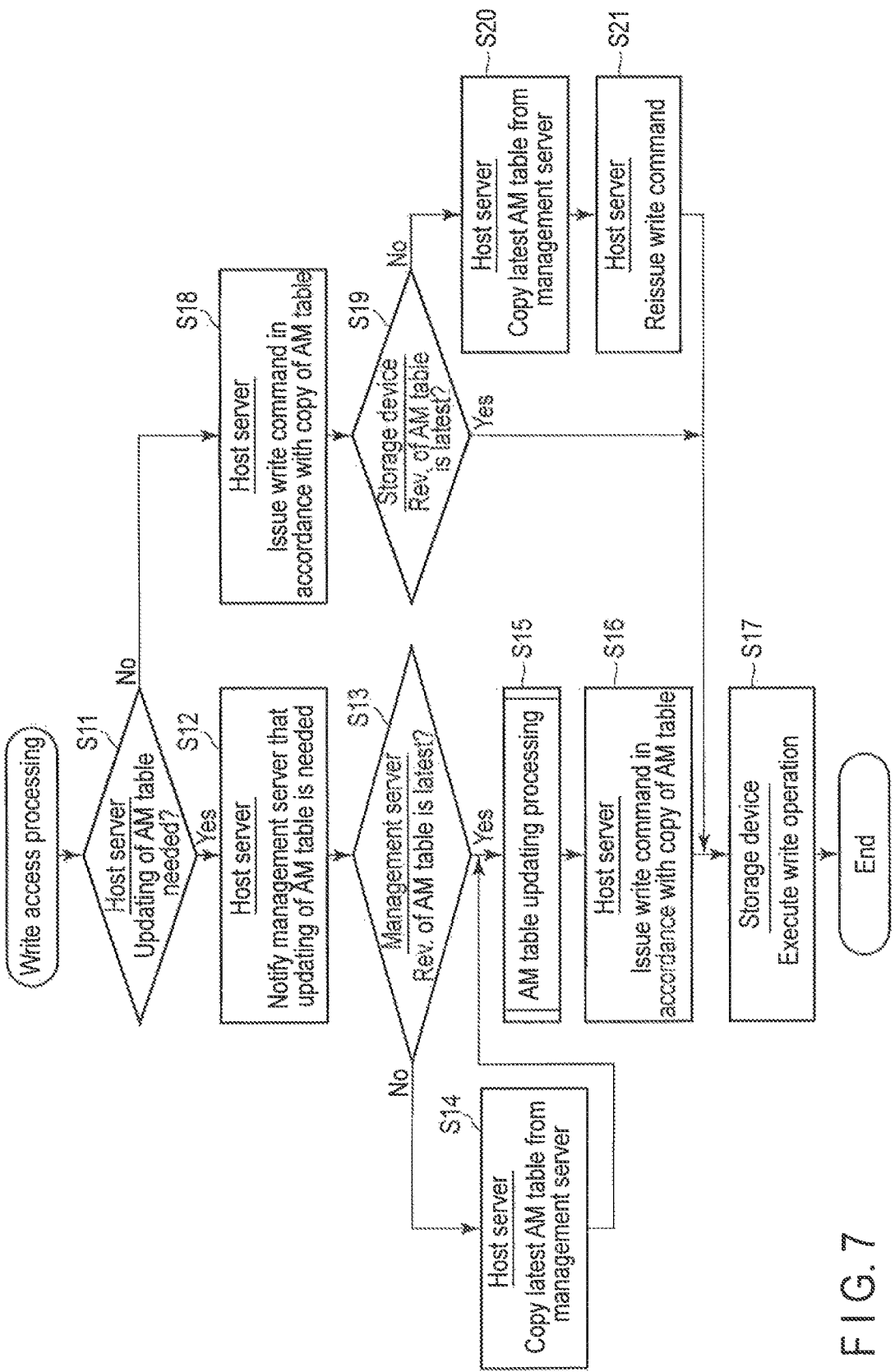
F I G. 7

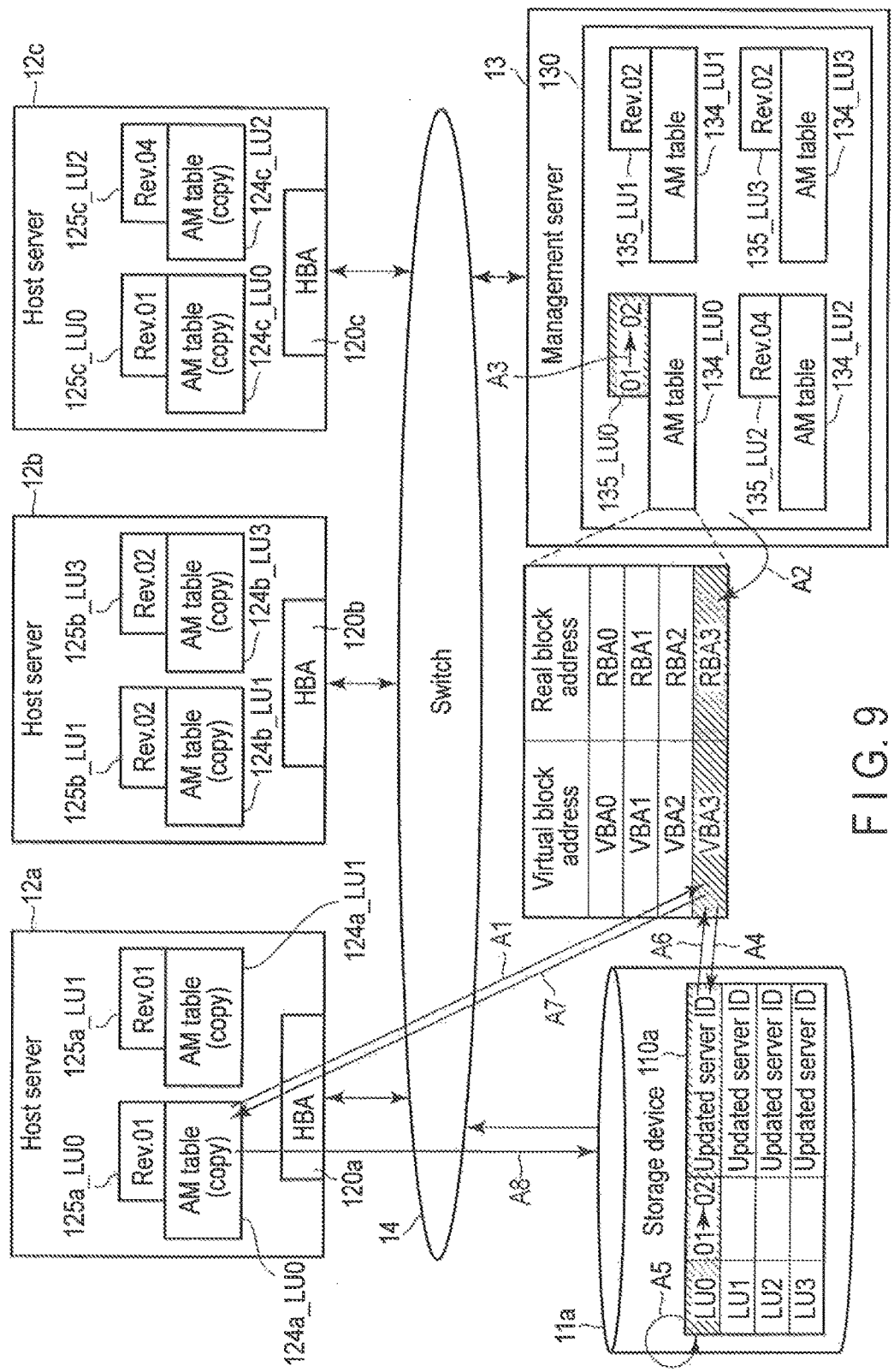
F I G. 9

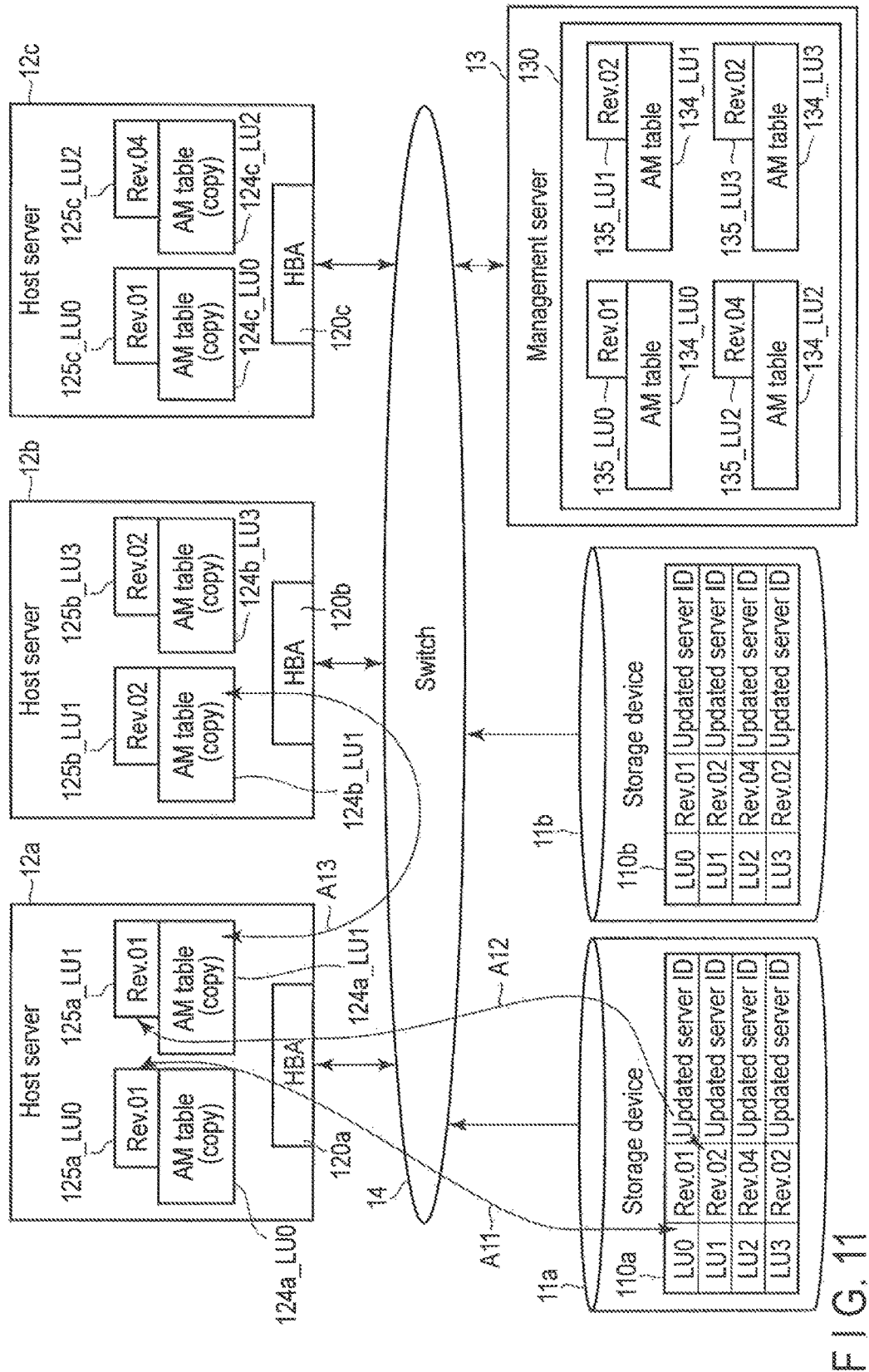
F I G. 11

A shared storage system utilizes logical units, The logical units are also called logical volumes or logical disks, and have logical storage areas. An arbitrary storage position in a logical storage area is designated by a virtual address. The logical storage area is associated with at least a part of a physical storage area in at least one of the plurality of storage devices. The management server holds address management information (e.g., address management tables), for the respective logical units in the shared storage system, in order to manage the correspondence between virtual addresses and real addresses in the storage devices for the respective logical units.

SHARED STORAGE SYSTEM AND METHOD FOR CONTROLLING ACCESS TO STORAGE DEVICE

CROSS REFERENCE TO RELATED APPLICATIONS

This application is a Continuation Application of PCT Application No. PCT/JP2014/065471, filed Jun. 11, 2014, the entire contents of which are incorporated herein by reference.

FIELD

Embodiments described herein relate generally to a shared storage system and a method for controlling access to a storage device.

BACKGROUND

Shared storage systems have recently been developed significantly. The shared storage systems are storage systems in which a plurality of storage devices are shared by a plurality of host servers. Each of the shared storage systems generally incorporates a management server for managing the entire system.

Assume here that a host server in the shared storage system accesses a target storage position in a logical unit mounted (provided) therein. In this case, the host server interrogates the management server for the address (i.e., real address) of the storage position in a storage device, which is associated with the virtual address of the target storage position, and the storage device (more specifically, the identifier of the storage device). Namely, when accessing a target storage position in a logical unit, the host server accesses the management server in order to ascertain a storage position in a storage device, which is associated with the target storage position. Such access to the management server also occurs when each of the other host servers in the shared storage system accesses a target storage position in a logical unit.

As described above, when accessing a target storage position in a logical unit provided in a respective one of the plurality of host servers in the shared storage system, the respective one must access the management server. In this shared storage system, concentration of access on the management server by the host servers is regarded as a bottleneck in enhancing the performance of the entire system. In other words, even if, for example, the number of host servers or the number (or storage capacity) of the storage devices is increased in the shared storage system, further concentration of access on the management server will occur, which makes it difficult to achieve system performance that covers such an increase.

To overcome the concentration of access on the management server, the following structure may be contrived. Namely, a plurality of host servers in the shared storage system may hold respective copies of address management information stored in the management server. In such a structure, a respective one of the plurality of host servers can acquire a real address associated with the virtual address of a target storage position, based on the copy of the address management information, held by the respective one. This means that each host server can access the target storage position without referring to the management server.

In the above structure, however, if the address management information has been updated in accordance with updating of data by, for example, a first host server, it is difficult to make the address management information coincide between the first host server and the other host servers.

BRIEF DESCRIPTION OF THE DRAWINGS

FIG. 2 is a conceptual view showing a correspondence example between the logical storage areas of logical units and the physical storage areas of two storage devices;

FIG. 3 shows a data structure example of the management information shown in FIG. 1;

FIG. 5 shows a data structure example of the address management table shown in FIG. 1;

FIG. 6 shows an exemplary command format employed in the embodiment;

FIG. 7 is a flowchart showing an exemplary procedure of write access processing in the embodiment;

FIG. 9 is a view for explaining the address management table updating processing;

FIG. 11 is a view for explaining the access processing performed when the management server is down.

DETAILED DESCRIPTION

Various embodiments will be described hereinafter with reference to the accompanying drawings.

In general, according to one embodiment, a shared storage system comprises a plurality of host servers, a plurality of storage devices, a management server and a switch. The plurality of storage devices are shared between the plurality of host servers. The management server is configured to provide the plurality of host servers with a plurality of logical units. At least parts of storage areas of the plurality of storage devices are allocated to the plurality of logical units. The switch is configured to connect the plurality of host servers, the plurality of storage devices and the management server. The management server is configured to manage, for the respective logical units using first address management information, correspondences between virtual addresses in the respective logical units, real addresses in storage devices allocated to the virtual addresses, and storage identifiers indicative of the storage devices. The management server is further configured to manage a revision of the first address management information the respective logical units, using first revision data. Each of the plurality of host servers is configured to hold second address management information and second revision data that are copies of the first address management information and the first revision data corresponding to a logical unit included in the plurality of logical units, respectively. Each of the plurality of host servers is configured to obtain, from the second address management information corresponding to a first logical unit, a first real address and a first storage identifier associated with a first virtual address in the first logical unit, when accessing the first virtual address. Each of the plurality of host servers is further configured to request a storage device indicated by the first storage identifier to execute access, using a firs logical unit identifier indicative of the first logical unit, the first real address, and the second revision data corresponding to the first logical unit. Each of the plurality of storage devices is configured to hold updated management information including third revision data indicative of a revision of the first address management information notified by the management server in accordance with updating of the first address management information. Each of the plurality of storage devices is further configured to execute requested access based on the first real address on condition that at least the second revision data coincides with the third revision data corresponding to the first logical unit, when a firs host server included in the plurality of host servers requests the access, using the first logical unit identifier the first real address and the second revision data.

Figure 1:
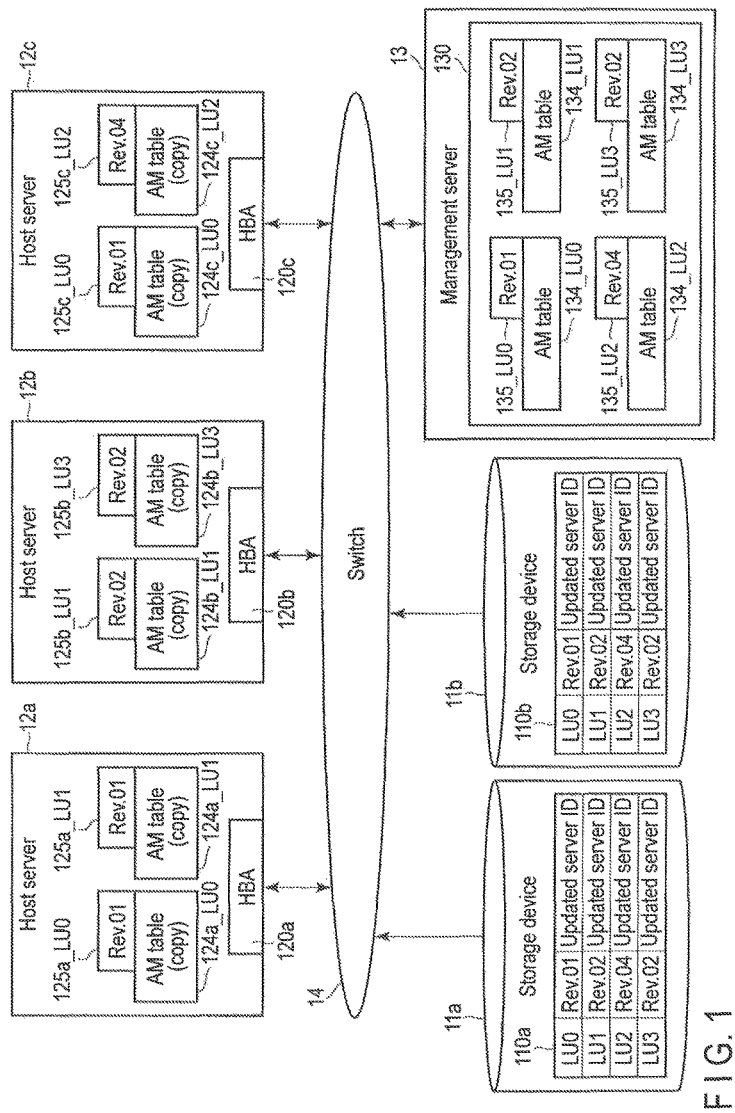
FIG. 1 is a block diagram showing an exemplary configuration of a shared storage system according to one embodiment.

FIG. 1 is a block diagram showing an exemplary configuration of a shared storage system according to one embodiment. The shared storage system shown in FIG. 1 comprises a plurality of storage devices (e.g., two storage devices 11a and 11b), a plurality of host servers (e.g., three host servers 12a, 12b and 12c), and a management server 13. Thus, in the embodiment, the shared storage system comprises two storage devices 11a and 11b. However, the shared storage system may comprise three or more storage devices. Similarly, although the shared storage system comprises three host servers 12a, 12b and 12c, it may comprise two storage devices or four or more storage devices.

The host servers 12a, 12b and 12c comprise host bus adaptors (HBA) 120a, 120b and 120c, respectively. The HBAs 120a, 120b and 120c are also called host controllers and used to connect the host servers 12a, 12b and 12c to other network devices or the storage devices.

The storage devices 11a and 11b, the host servers 12a, 12b and 12c more specifically, the HBAs 120a, 120b and 120c of the host servers 12a, 12b and 12c), and the management server 13 are connected via a switch 14, such as a switching hub (network switch). This connection realizes a network (shared storage system) comprising the storage devices 11a and 11b, the host servers 12a, 12b and 12c and the management server 13, whereby the storage devices 11a and 11b are shared by the host servers 12a, 12b and 12c.

In the embodiment, the servers 12a, 12b, 12c and 13 are independent computers. However, at least two of the host servers 12a, 12b and 12c may operate on one computer. Further, at least one of the host servers 12a, 12b and 12c and the management server 13 may operate on one computer.

Part of the storage areas (i.e., the physical storage areas) of the storage devices 11a and 11b is allocated to, for example, part of the storage areas (i.e., the logical storage areas) of logical units LU0 to LU3 (FIG. 2). FIG. 2 is a conceptual view showing a correspondence example between the storage areas of the logical units LU0 to LU3 and the storage areas of the storage devices 11a and 11b. In the embodiment, the storage devices 11a and 11b are each formed of a hard disk drive (HDD) array. More specifically, the storage device 11a is a storage device of a RAID (Redundant Arrays of Inexpensive Disks or Redundant Arrays of Independent Disks) structure comprising a plurality of hard disk drives (HDDs). Similarly, the storage device 11b is also a storage device of a RAID structure comprising a plurality of HDDs. At least one of the storage devices 11a and 11b may be formed of an array (e.g., a flash array) comprising storage devices other than the HDDs. Further, the storage devices 11a and 11b do not always have to have an array structure.

In the example of FIG. 2, parts of the storage areas of the logical units LU0 to LU3 are associated with parts of the storage area of the storage device 11a. Further, other parts of the storage areas of the logical units LU0 to LU3 are associated with parts of the storage area of the storage device 11b. However, the entire storage area of the logical unit LU0, LU1, LU2 or LU3 may be associated with at least a part of the storage area of the storage device 11a or 11b.

Assume here that a host server 12j (j is a, b or c) that can utilize (recognize) a logical unit LUi (i is 0, 1, 2 or 3) accesses a target storage position (hereinafter, referred to as a first storage position) in the logical unit LUi. In this case, the host server 12j must know (recognize) a storage position (hereinafter, referred to as a second storage position) in a storage device 11k (k is a or b) associated with the first storage position, and know (recognize) the storage device 11k itself.

The address of the first storage position is called a virtual address, and the address of the second storage position is called a real address. In the embodiment, the storage area of the logical unit LUi and that of the storage device 11k are each divided for management into small areas of a predetermined size (first size) called blocks (more specifically, virtual blocks and real blocks). Namely, the logical unit LUi and the storage device 11k comprise a plurality of virtual blocks and a plurality of real blocks, respectively. Therefore, in the embodiment, virtual block addresses (VBAs) and real block addresses (RBAs) are used as virtual addresses and real addresses, respectively. The virtual block addresses and the real block addresses may be referred to as logical block addresses and physical block addresses, respectively.

Returning to FIG. 1, the management server 13 constructs logical units and provides them to at least one of the host servers 12a, 12b and 12c. In the embodiment, the management server 13 constitutes the logical units LU0 to LU3. The management server 13 also provides the logical unit LU0 to the host servers 12a and 12c, and provides the logical unit LU1 to the host servers 12a and 12b. The management server 13 further provides the logical unit LU2 to the host server 12c, and provides the logical unit LU3 to the host server 12b. Namely, the host server 12a mounts the logical units LU0 and LU1, the host server 12b mounts the logical units LU1 and LU3, and the host server 12c mounts the logical units LU0 and LU2.

The management server 13 holds management information 130 used to manage the logical units LU0 to LU3. More specifically, the management information 130 is stored in a local storage device incorporated in the management server 13. In the embodiment, the local storage device is a nonvolatile storage device (for example, a nonvolatile memory such as a flash memory, or a disk storage device such as an HDD).

The management information 130 includes address management tables (hereinafter, AM tables) 134_LU0 to 134_LU3 corresponding to the logical units LU0 to LU3, respectively. The AM table (first address management information) 134_LUi (i=0, 1, 2, 3) has entries for holding address management data corresponding to the virtual block addresses in the logical unit LUi (i=0, 1, 2, 3). As will be described in detail, the entries (address management data) each include a combination of a logical unit number (LUN) field, a virtual block address field, a storage identifier (ID) field and a real block address field.

The management information 130 also includes revision data (first revision data) 135_LU0 to 135_LU3. The revision data 135_LU0 to 135_LU3 is indicative of revisions of the AM tables 134_LU0 to 134_LU0 corresponding to the logical units LU0 to LU3, respectively. In the embodiment, the revision data 135_LU0 to 135_LU3 includes revision numbers (RN) indicative of the revisions of the AM tables 134_LU0 to 134_LU3, respectively. In the example of FIG. 1, the revisions (rev.) of the AM tables 134_LU0, 134_LU1, 134_LU2 and 134_LU3 are 01 (rev. 01), 02 (rev. 02), 04 (rev. 04) and 02 (rev. 02), respectively. In the embodiment, assume that the revision data 135_LU0 to 135_LU3 is attached to the AM tables 134_LU0 to 134 _LU3, respectively.

The host servers 12a, 12b and 12c hold copies of the respective AM tables corresponding to the logical units that are included in the management information 130 held by the management server 13, and are mounted in the host servers (namely, recognizable logical units). In the embodiment, the host server 12a holds AM tables (second address management information) 124a_LU0 and 124a_LU1 that are copies of the AM tables (first address management information) 134_LU0 and 134_LU1, respectively. The host server 12b holds AM tables (second address management information) 124b_LU1 and 124b_LU3 that are copies of the AM tables (first address management information) 134_LU1 and 134_LU3, respectively. The host server 12c holds AM tables (second address management information) 124c_LU0 and 124c_LU2 that are copies of the AM tables (first address management information) 134_LU0 and 134_LU2, respectively.

Further, the host server 12a holds revision data (second revision data) 125a_LU0 and 125a_LU1 indicative of the revisions (revision numbers) of the AM tables 124a_LU0 and 124a_LU1, respectively. The host server 12b holds revision data (second revision data) 125b_LU1 and 125b_LU3 indicative of the revisions of the AM tables 124b_LU1 and 124b_LU3, respectively. The host server 12c holds revision data (second revision data) 125c_LU0 and 125c_LU2 indicative of the revisions of the AM tables 124c_LUG and 124c_LU2, respectively.

In the embodiment, the AM tables 124a_LU0 and 124a_LU1 and the revision data 125a_LU0 and 125a_LU1 are stored in a local storage device incorporated in the HBA 120a of the host server 12a. In the embodiment, this local storage device is a nonvolatile storage device (for example, a nonvolatile memory such as a flash memory). Similarly, the AM tables 124b_LU1 and 124b_LU3 and the revision data 125b_LU1 and 125b_LU3 are stored in a local, storage device incorporated in the HBA 120b of the host server 12b. Yet similarly, the AM tables 124c_LUG and 124c_LU2 and the revision data 125c_LU0 and 125c_LU2 are stored in a local storage device incorporated in the HBA 120c of the host server 12c. In FIG. 1, however, the AM tables and the revision data are arranged outside the HBA, for convenience of drawing.

The storage devices 11a and 11b hold updated management tables (hereinafter, UM tables) 110a and 110b, respectively. In the embodiment, the UM tables (updated management information) 110a and 110b are stored in local storage devices incorporated in the controllers of the storage devices 11a and 11b, respectively. These local storage devices are nonvolatile storage devices (for example, nonvolatile memories such as flash memories, or disk storage devices such as HDDs).

The UM tables 110a and 110b have entries for holding updated management data corresponding to the logical units LUi (i=0, 1, 2, 3) to which parts of the physical storage areas of the storage devices 11a and 1ib are at least allocated. Each of the entries (updated management data) includes a combination of a logical unit number (LUN) field, a revision number (RN) field and an updated server ID field. The LUN field is used to hold the logical unit number of a logical unit LUi corresponding to updated management data. The logical unit number is used as an identifier for the logical unit LUi. The RN field is used to hold information (third revision data) e.g., revision number, indicative of the latest revision of an AM table 134_LUi associated with the logical unit LUi corresponding to the updated management data. The updated server ID field is used to hold the ID of a host server (i.e., an updated server ID) that has requested the management server 13 to update the revision of the AM table 134_LUi associated with the logical unit LUi corresponding to the updated management data. Based on the request by the host server indicated by the updated server ID, the revision number of the AM table 134_LUi updated by the management server 13 is held in the RN field. Namely, the LUN field of the updated management data holds the logical unit number of the logical unit LUi corresponding to the updated management data, the updated server ID field of the updated management data holds the ID of the host server that has requested to update the revision of the AM table 134_LUi associated with the logical unit LUi corresponding to the updated management data, and the RN field of the updated management data holds the revision number of the updated AM table 134_LUi.

FIG. 3 shows a data structure example of the management information 130 shown in FIG. 1. The management information 130 comprises a pointer list 131, pointer tables 132_0 to 132_3, host server lists 133_LU0 to 133_LU3 corresponding to the logical units LU0 to LU3, AM tables 134_LU0 to 134_LU3 corresponding to the logical units LU0 to LU3, and revision data corresponding to the logical units LU0 to LU3. For the convenience of drawing, FIG. 3 only shows the host server lists, AM tables and revision data corresponding to the logical units LU0 and LU1. Namely, although FIG. 3 shows the host server lists 133_LU0 and 133_LU1, the AM tables 134_LU0 and 134_LU1, and revision data 135_LU0 and 135_LU1, it does not show host server lists, AM tables and revision data corresponding to the logical units LU2 and LU3.

The pointer list 131 includes a first element and an array of second elements. The first element is, for example, a leading element in the pointer list 131, and includes list management data N_LU indicative of the number of second elements. In the embodiment, the list management data N_LU is indicative of 4 (N_LU=4) corresponding to the number of the logical units LU0 to LU3 managed (provided) by the management server 13. The array of second elements includes pointers PP_LU0 to PP_LU3 equal in number to that indicated by the list management data N_LU. Namely, the pointer list 131 holds the list management data N_LU and the pointers PP_LU0 to PP_LU3.

The pointers PP_LU0 to PP_LU3 correspond to the logical units LU0 to LU3 and are indicative of the pointer tables 132_0 to 132_3, respectively, The pointer tables 132_0 to 132_3 hold pointers (host server list pointers) HSLP_LU0 to HSLP_LU3, and pointers (AM table pointers) AMTP_LU0 to AMTP_LU3, respectively.

The pointers HSLP_LU0 to HSLP_LU3 are indicative of the host server lists 133_LU0 to 133_LU3. The pointers AMTP_LU0 to AMTP_LU3 are indicative of the AM tables 134_LU0 to 134_LU3 (and the revision data 135_LU0 to 135_LU3), respectively. However, FIG. 3 does not show the host server lists 133_LU2 and 133_LU3, and the AM tables 134_LU2 and 134_LU3 (and the revision data 135_LU2 and 135_LU3), for convenience of drawing.

The host server list 133_LUi (i=0, 1, 2, 3) comprises a third element and an array of fourth elements. The third element is the leading element of, for example, the host server list 133_LUi, and includes list management data N_HS representing the number of fourth elements. The array of fourth elements includes IDs (host server IDs) allocated to j host servers indicated by the list management data N_HS. The j host server IDs held by the host server list 133_LUi represent j host servers provided with a logical unit LUi. For instance, in the embodiment, the logical unit LU0 is provided to the host servers 12a and 12c, and the logical unit LU1 is provided to the host servers 12a and 12b. Assume here that the host server IDs of the host servers 12a, 12b and 12c are HSIDa, HSIDb and HSIDc, respectively. In this case, the host server list 133_LU0 holds HSIDa and HSIDc, and the host server list 133_LU1 holds HSIDa and HSIDb. Further, the host server list 133_LU2 holds HSIDc, and the host server list 133_LU3 holds HSIDb, although FIG. 3 does not show them.

Figure 4:
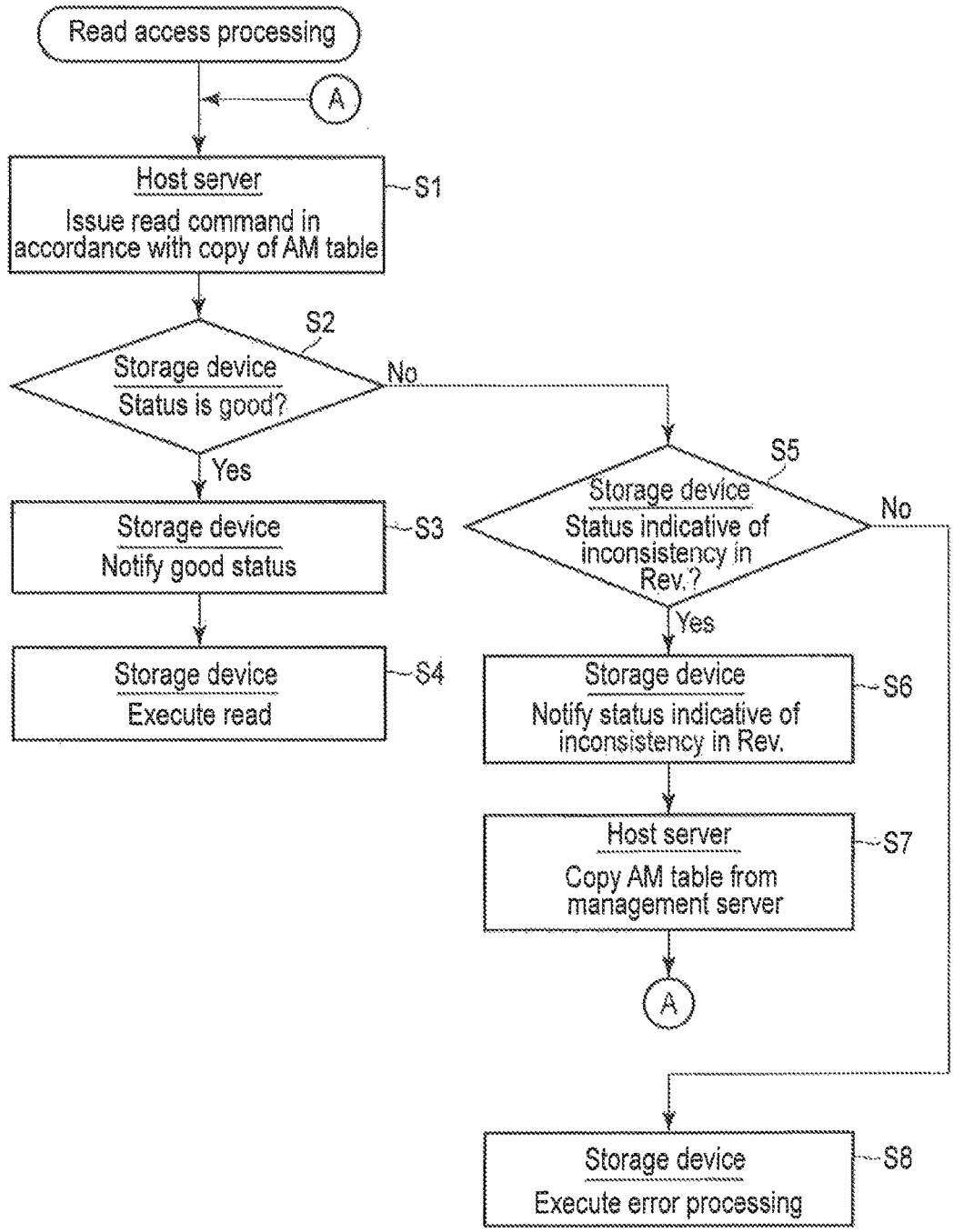
FIG. 4 is a flowchart showing an exemplary procedure of read access processing in the embodiment.

Referring then to FIG. 4, the operation of the embodiment will be described, using read access processing as an example. FIG. 4 is a flowchart showing an exemplary procedure of read access processing in the embodiment. In FIG. 4, underlined letter strings in respective figures (rectangular or rhombic figures) indicative of the steps of the flowchart represent the subjects of operations performed in the steps. The same can be said of the flowcharts of FIGS. 7, 8 and 10.

Assume here, for example, that a read. access request to access the logical unit LU0 has occurred in the host server 12a. At this time, the host server 12a (more specifically, the HBA 120a of the host server 12a) generates a read command in accordance with a copy of the AM table 134_LU0 (i.e., the AM table 124a_LU0) held by itself, and issues the read command to the storage device (step S1).

FIG. 5 shows a data structure example of the AM table 134_LUi (i=0, 1, 2, 3). The AM table 134_LUi has entries that hold address management data corresponding to the respective virtual block addresses in the logical unit LUi. Each of the entries (address management data) includes a combination of a logical unit number (LUN) field, a virtual block address field, a storage ID field and a real block address field.

The LUN field is used to hold a number unique to the corresponding logical unit LUi, i.e., a logical unit number (LUN=LUNi). The virtual block address field is used to hold a virtual block address (VBA) in the corresponding logical unit LUi. The storage ID field is used to hold the ID of the storage device including a storage position designated by a real block address allocated to the corresponding virtual block address, namely, to hold a storage ID (SID). The real block address field is used to hold a real block address (RBA) allocated to the corresponding virtual block address (VISA). A copy of the AM table 134_LUi has the same data structure as the AM table 134_LUi shown in FIG. 5.

In the case of the AM table 134_LUi shown in FIG. 5, for instance, the real block addresses RBA0, RBA1 and RBA2 in a storage device with a storage ID of SIDa are allocated to the virtual block addresses VBA0, VBA1 and VBA2 in the logical units LUi. Assume here that SIDa represents the storage ID of the storage device 11a. Also assume that the AM table 134_LUi shown in FIG. 5 is the AM table 134_LU0 (i=0), and that the AM table 124_LU0 in the host server 12a is a copy of the AM table 134_LU0 (i=0). Assume further that a read access request generated in the host server 12a is indicative of a data read from the virtual block address VBA0 in the logical unit LU0.

In this case, the host server 12a determines a real block address in a storage device (storage ID) to be actually (physically) accessed and the ID of the storage device, based on the virtual block address VBA0 in the logical unit LU0 and the AM table 124_LU0. In this case, the ID (SIDa) of the storage device 11a and the real block address RBA0 in the storage device 11a are determined. The host server 12a also specifies the revision of the AM table 124a_LU0 (i.e., the revision of the AM table 134_LU0 recognized by the server itself), based on the revision data 125a_LU0. In this case, revision 01 (RN=01) is specified.

Thus, in step S1, the host server 12a issues, to the storage device 11a, a read command to designate a data read from the real block address RBA0 in the storage device 11a. This read command includes the real block address RBA0 determined as the above. The read command also includes a revision number (RN=01) indicative of the revision 01 specified as the above.

Namely, the read command is used to notify the storage device 11a of not only the address to access but also the revision number of the AM table 124a_LU0 having been used to obtain the address. The revision number formed of to the storage device 11a using the read command is the revision number of the AM table 134_LU0 recognized by the host server 12a that issues the read command. As the read command, a command descriptor block (CDB), for example, is used. The CDB is defined in Small Computer System Interface (SCSI).

FIG. 6 shows an exemplary format employed for a command (CDB) in the embodiment. As shown in FIG. 6, the embodiment uses a 12-byte CDB. The leading byte ($0^{th}$ byte) of the 12-byte CDB is used to hold an operation code. The operation code is formed of a three-bit (upper) group code and a five-bit (lower) command code. When the group code is 6 or 7 (i.e., in the case of group 6 or 7), a CDB corresponding thereto is uniquely defined in a vendor, and is generally a 6- or 10-byte CDB. In the embodiment, this definition is extended such that a 12-byte CDB obtained by adding 2 bytes to the trailing end of the 10-byte CDB is defined as a CDB of extended group 7 (hereinafter, referred to as an extended CDB).

The upper three bits of the first byte of the extended CDB are used to hold the logical unit number (LUN), and the second to fifth bytes of the extended CDB are used to hold the real block address. In general, the second to fifth bytes of the ODE are used to hold the logical block address. Namely, the second to fifth bytes of the extended CDB holds the real block address, as well as the logical block address. In the above-described embodiment, as the real block address, the real block address READ determined based on the virtual block address VBA0 in the logical units LU0 and the AM table 124a_LU0 is used. The real block address held in the second to fifth bytes of the extended ODE is indicative of the leading position (leading read block address) of the data block to be transferred. The sixth byte of the extended ODE is used as a reservation. The seventh and eighth bytes of the extended CDB are used to hold data indicative of the number of data blocks to be transferred (i.e., transfer data length). The ninth and tenth bytes of the extended CDB are used to hold data (e.g., RN) indicative of the revision of the AM table. The RN (revision number) is data newly defined in the extended CDB. Thus, in the embodiment, the extended ODE includes the RN (revision number) of the AM table. The eleventh byte (final byte) of the extended CDB is used to hold a control byte.

Upon receiving the read command from the host server 12a, the storage device 11e determines whether a read operation designated by the received read command can be normally performed. Namely, the storage device 11a determines whether the status associated with the received read command is good (step S2).

The determination in step S2 will be described in detail. Firstly, (the storage device 11a obtains the revision number (RN) of a latest AM table corresponding to a logical unit indicated by a logical unit number LUN included in the received read command, as follows: Based on the logical unit number LUN (in this case, LUN=LUN0) included in the received read command, the storage device 11a refers to the UM table 110a. The storage device 11a obtains the revision number (RN) from the entry of the UM table 110a associated with the logical unit number LUN (LUN0). In the embodiment where the logical unit number LUN is LUN0, the revision number of the latest AM table 134_LU0 is obtained.

Subsequently, the storage device 11a compares the revision number included in the received read command with the obtained revision number (i.e., the revision number of the latest AM table 134_LU0). Depending upon whether the both revision numbers are identical to each other and whether the data read designated by the read command can be normally performed, the storage device 11a determines whether the status associated with the execution of the read command is good (step S2).

If the status is good (Yes in step S2), the storage device 11e notifies the host server 12a of a known good status (i.e., a good status constituted of a status byte) in response to the read command therefrom (step S3). After that, the storage device 11a performs the read operation designated by the read command (step S4).

In contrast, assume here that the status is not good (No in step S2), and that the reason for this lies in revision inconsistency (Yes in step S5). In this case, the storage device 11a notifies the host server 12a of an error status indicative of the revision inconsistency in response to the read command therefrom (step S6). In the embodiment, the error status (error status byte) indicative of the revision inconsistency is realized by a pattern, such as "11000," that is not defined as a general status byte (i.e., a pattern defined as a reservation).

Upon receiving the error status indicative of the revision inconsistency, the host server 12a obtains, from the management server 13, a copy of the latest AM table 134_LU0 associated with the logical unit LU0, and holds the copy as a latest AM table 124a LU0 (step S7). Namely, the host server 12a updates the AM table 124a_LU0 held therein with the copy of the AM table 134_LU0 obtained from the management server 13. Revision data 135_LU0 is attached to the AM table 134_LU0. Accordingly, the host server 12a also obtains a copy of the revision data 135_LU0 by obtaining the copy of the AM table 134_LU0. Thus, the host server 12a updates the AM table 124a_LU0 with the latest content, and at the same time updates the revision data 125a_LU0 to represent the latest revision number.

After that, the host server 12a returns to step S1, where the host server 12a regenerates a read. command in accordance with the latest AM table 124a_LU0 (i.e., the copy of the latest AM table 134_LU0). In step S1, the host server 12a issues a regenerated read command to the storage device 11a.

In contrast, assume here that the status associated with the execution of the read command is not good (No in step S2), and that the reason for this is other than the revision inconsistency (No in step S5). This type of error is, for example, an error that a read block address, which cannot be recognized by the storage device 11a, is included in the read command In the case of this error, the storage device 11a performs corresponding error processing as in the prior art (step S8).

In The embodiment, the command issued by the host server 12a to the storage device 11a includes the RN (revision number) of the AM table 124_LU0 held by the host server 12a. This enables the host server 12a to notify the storage device 11a of the revision of the AM table 124_LU0 (a copy of the AM table 134_LU0) held by the host server 12a, without using a special protocol upon transmission of an access request.

Upon receiving a read command from the host server 12a, the storage device ha can compare a revision number included in the read command with a revision number held by itself. Namely, the storage device 11a can determine whether the AM table 124_LU0 (a copy of the AM table 134_LU0) held by the sender of the read command (i.e., the host server 12a) is latest, based on the read command. In the embodiment, no special access is needed for enabling this determination, and hence no overhead will occur because of it. Further, in the embodiment, the introduction of the above determination in the storage device can omit distribution, to all host servers, of a copy of the AM table 134_LU0 held by the management server 13.

It is apparent that the above-described advantage of the embodiment can also be obtained when the host server 12b or 12c has issued a request to access a logical unit. Further, in the embodiment, a host server does not have to interrogate the management server 13 for a real block address whenever a request to access a logical unit has been issued, since it has a copy of an AM table. This enables access of low latency to be realized. Furthermore, in the embodiment, there is no concentration of access on the management server 13, and hence a shared storage system with no bottleneck can be realized, and system performance that can cover an increase in the number of host servers or storage devices (or an increase in storage capacity) can be obtained.

Figure 8:
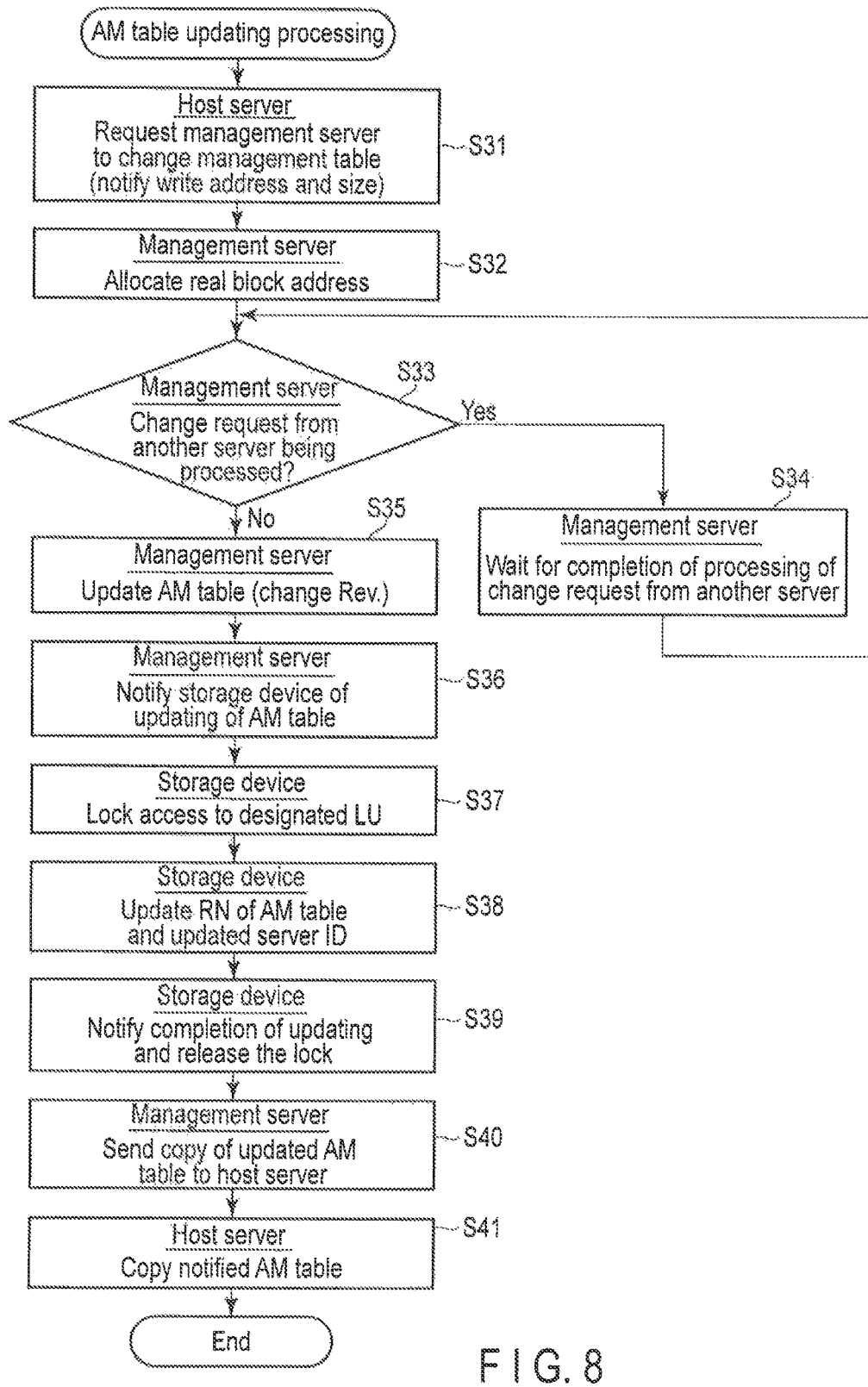
FIG. 8 is a flowchart showing an exemplary procedure of address management table updating processing included in the write access processing shown in FIG. 7.

Referring then to FIGS. 7 to 9, a description will be given of write access processing in the embodiment. FIG. 7 is a flowchart, showing an exemplary procedure of write access processing in the embodiment. FIG. 8 is a flowchart showing an exemplary procedure of AM (address management) table updating processing included in the write access processing shown in FIG. 7. FIG. 9 is a view for explaining the address management table updating processing.

Assume here that, for example, a request to make a write access to the logical unit LU0 has occurred in the host server 12a. At this time, the host server 12a determines whether it is necessary to update the AM table 134_LU0 held by the management server 13 (step S11). In the case of, for example, a write to a new area in the logical unit LU0, it is necessary to update the AM table 134_LU0. In this case, the AM table 134_LU0 must be updated before the write access. The new area is indicative of an storage area which is included in the logical unit LU0, and to which any storage area in the storage device 11a or 11b is not allocated (i.e., the new area is not registered in the AM table 134_LU0).

If it is necessary to update the AM table 134_LU0 (Yes in step S11), the host server 12a notifies the management server 13 of the necessity of the updating (step S12). A revision number (RN) indicative of the revision of the AM table 124a_LU0 held by the host server 12a is attached to this notification. The revision number of the AM table 124a_LU0 is indicated by revision data 125a_LU0 held by the host server 12a.

Based on the notification from the host server 12a, the management server 13 determines, as described below, whether the revision of the AM table 124a_LU0 held by the host server 12a is latest (step S13). Firstly, the management server 13 compares a revision number included in the notification from the host. server 12a with a revision number (i.e., a latest revision number) indicated by the revision data 135_LU0 held by the management server 13. Subsequently, the management server 13 determines whether the revision of the AM table 124a_LU0 held by the host server 12a is latest, based on whether both revision numbers are identical to each other.

Assume here that the revision of the AM table 124a_LU0 is not latest (No in step S13). In this case, the management server 13 provides the host server 12a with copies of the latest AM table 134_LU0 and the latest revision data 135_LU0 held by the server 13, in response to the above-mentioned notification (step S12). Based on these copies, the host server 12a updates the AM table 124a_LU0 and the revision data 125a_LU0 (step S14).

At this time, the management server 13 cooperates with the host server 12a and the storage devices to perform AM table updating processing (step S15). In the embodiment, the storage devices that cooperate with the management server 13 and the host server 12a to perform the AM table updating processing are storage devices (i.e., storage devices 11a and 11b) whose storage areas are allocated to the logical units LU0. In contrast, if the revision of the AM table 124a_LU0 is latest (Yes in step S13), the management server 13 cooperates with the host server 12a to perform the AM table updating processing (step S15).

Referring then to FIGS. 8 and 9, a description will be given of the AM table updating processing (step S15). Firstly, the host server 12a requests the management server 13 to change (update) the AM table 134_LU0 (step S31), as indicated by arrow A1 in FIG. 9. This request includes a virtual block address (leading write address) in a logical unit LU0, at which data is to be written, and the size of data blocks to be written (i.e., the number of the data blocks). Namely, the host server 12a notifies the management server 13 of the write address (virtual block address) and the size by requesting the management server 13 to change the AM table 134_LU0. Assume here that the write address is a vertical block address VBA3, and the size (the number of the data blocks) is 1.

The management server 13 determines a storage area in the storage device 11a or 11b, which is to be allocated to a storage area (new area) of the logical unit LU0 indicated by the write address (vertical block address VBA3) and the size (=1) notified by the host server 12a (step S32). Assume here that the new area in the logical unit LU0 is designated by the vertical block address VBA3, and that part of the free area of the storage device 11a or 11b is determined as a storage area to be allocated to the new area. Assume further that the determined storage area is included in the storage device 11a or 11b, and is designated by a seal block address RBA3. In step S32, the management server 13 allocates the determined storage area to the new area in the logical unit LU0. Namely, the management server 13 allocates the real block address RBA3 of the determined storage area to the virtual block address VBA3 of the new area of the logical unit LU0 notified by the host server 12a.

After that, the management server 13 determines whether it is now processing a change request (i.e., corresponding to the change request in step S31) from a host server other than the host server 12a (step S33). If it is determined that the change request from another host server is being processed (Yes in step S33), the management server 13 waits for completion of the processing associated with the change request from the host server (step S34).

In contrast, if it is determined that the change request from another host. server is not being processed (No in step S33), the management server 13 proceeds to step S35. In step S35, the management server 13 updates the AM table 134_LU0 and the revision data 135_LU0 to reflect the allocation of the read block address RBA3 to the virtual block address VBA3 (step S32). More specifically, the management server 13 adds, to the AM table 134_LU0, address management data that includes the virtual block address VBA3 notified by the host server 12a and the real block address RBA3 allocated to the virtual block address VBA3, as is indicated by arrow A2 in FIG. 9. Further, the revision number corresponding to the revision data 135_LU0 is changed as indicated by arrow A3 in FIG. 3. In the embodiment, the revision number corresponding to the revision data 135_LU0 is changed from 01 to 02. The changed revision data 135_LU0 is indicative of that the revision (revision number) of the updated AM table 134_LU0 is 02.

Thereafter, the management server 13 notifies storage devices with storage areas allocated to the logical unit LU0 of the updating of the AM table 134_LU0 (step S36). In the embodiment, the storage devices having the storage areas allocated to the logical unit LU0 are the storage devices 11a and 11b. In this case, the updating of the AM table 134_LU0 is notified of to the storage device 11a as indicated by arrow A4 in FIG. 9. The updating of the AM table 134_LU0 is also notified of to the storage device 11b, although this is omitted from FIG. 9. This notification includes the ID of the host server 12a having requested the updating of the AM table 134_LU0, and the logical unit number LU0 of the logical unit LU0.

Upon receiving the notification of the updating from the management server 13, the storage device 11a locks access to the logical unit LU0 associated with the AM table 134_LU0 (i.e., the logical unit LU0 designated by the updating notification) (step S37). The storage device 11b executes step S37, like the storage device 11a. Subsequently, the storage device 11a updates the revision number (RN) and the updated server ID included in the UM table 110 and associated with the logical unit number LU0 of the logical unit LU0, as is indicated by arrow A5 in FIG. 9 (step S38). The storage device 11b also executes step S38, like the storage device 11a. At this time, the revision number is updated from 01 to 02, and the updated server ID is updated to the host server ID of the host server 12a.

After that, the storage device 11a notifies the management server 13 of the completion of the updating of the UM table 110, as indicated by arrow A6 in FIG. 9, thereby releasing the logical unit LU0 from the locked state (step S39). The storage device 11b also executes step S39, like the storage device 11a.

At this time, the management server 13 transmits, to the host server 12a, copies of the updated AM table 134_LU0 and the revision data 135_LU0, as indicated by arrow A7 in FIG. 9 (step S40). The host server 12a holds the received copies of the updated AM table 134_LU0 and the revision data 135_LU0 as latest AM table 124a_LU0 and the latest revision data 125a_LU0 (step S41). Namely, the host server 12a updates the currently held AM table 124a_LU0 and revision data 125a_LU0 with the received copies of the updated AM table 134_LU0 and the revision data 135_LU0. This is the termination of the AM table updating processing (step S15).

Subsequently, the host server 12a generates a write command (CDB) having the data structure shown in FIG. 6, in accordance with the updated AM table 124a_LU0, and issues the write command to a storage device (step S16). In the embodiment, assume that the host server 12a issues the write command to the storage device 11a as indicated by arrow A8 in FIG. 9. Particulars of the write command are not described. If necessary, see a write command issued in step S18 described later.

The storage device 11a receives the write command from the host server 12a. In this case, the storage device 11a performs a write operation designated by the received write command (step S17). In the flowchart of FIG. 7, a description of a status associated with the execution of the write command by the storage device 11a upon receiving it is omitted. If necessary, see a description associated with an operation performed when the write command issued in step S18 has been received by the storage device 11a.

Assume here that a write access request having occurred in the host server 12a does not need the updating of the AM table 134_LU0 (No in step S11). For instance, a write access only for changing the existing data in the logical unit LU0 does not need updating of the AM table 134_LU0. In this case, the host server 12a generates a write command in accordance with the currently held AM table 124a_LU0, and issues the write command to a storage device (step S18). In the embodiment, assume that the write command is issued to the storage device 11a. The write command includes the logical unit number LU0 indicative of the logical unit LU0. The write command also includes the real block address RBA3 associated with the virtual block address VBA3, and the transfer data length (=the number of data blocks to which data is to be written=1). The write command further includes a revision number (RN) indicative of the revision of the AM table 124_LU0. As the revision number, the revision data 125a_LU0 held by the host server 12a is used.

Upon receiving the write command from the host server 12a, the storage device 11a determines as follows whether the revision of the AM table 124a_LU0 held by the host server 12a is latest (step S19): Firstly, the storage device 11a obtains a revision number (RN) from the entry of the UM table 110 associated with the logical unit number LUN0 included in the received write command. Subsequently, the storage device 11a compares the revision number included in the received write command with the obtained revision number. Depending upon whether the both revision numbers are identical to each other, the storage device 11a determines whether the revision of the AM table 124a_LU0 is latest.

I f the revision of the AM table 124a_LU0 is latest (Yes in step S19), the storage device 11a proceeds to step S17, where it performs a write operation designated by the received write command. More specifically, if a status associated with the execution of the received write command, which includes a status that the revision of the AM table 124a_LU0 is latest, is good, the storage device 11a performs the write operation designated by the received write command (step S17).

In contrast, if the revision of the AM table 124a_LU0 is not latest (No in step S19), the storage device 11a notifies the host server 12a of an error status indicative of revision inconsistency. Namely, if the status associated with the execution of the received write command is not good, and if the cause is the revision inconsistency, the storage device 11a notifies the host server 12a of the error status indicative of revision inconsistency.

At this time, the host server 12a obtains, from the management server 13, copies of the latest AM table 134_LU0 and the latest revision data 135_LU0, and holds the copies as the latest AM table 124a_LU0 and the latest revision data 125a_LU0 (step S20).

After that, the host server 12a regenerates a write command in accordance with the latest AM table 124a_LU0, and reissues the regenerated write command to the storage device 11a (step S21). The write command reissued by the host server 12a is received by the storage device 11a. If a status associated with the execution of the received write command, which includes a revision consistency status, is good, the storage device 11a performs a write operation designated by the received write command (step S17). If a status associated with the execution of the received write command is not good, and if the cause is other than revision inconsistency, the storage device 11a performs corresponding error processing.

In the flowchart of FIG. 7, the host server 12a proceeds to step S21 after executing step S20, thereby reissuing a write command. However, the host server 12a may return to step S18 after executing step S20, thereby reissuing a write command.

An operation performed in the embodiment to add a host server to the shared storage system of FIG. 1 will be described. The addition of a host server is realized by the following procedure: Firstly, a host server to be added is connected to the switch 14 that connects the storage devices 11a and 11b to the management server 13 in the shared storage system. Assume that the host server connected to the switch 14 mounts a logical unit LUi. In this case, the host server connected to the switch 14 obtains, from the management server 13, copies of an AM table 134_LUi and revision data 135_LUi associated with the logical unit LUi, and holds them. As a result, the host server is added to the shared storage system.

An operation performed when a failure has occurred in the shared storage system will be described. Main failures in the shared storage system include a temporal interruption in network connection and a failure in the management server 13.

A description will now be given of the case where network connection is temporarily interrupted. A generally supposed case where the management server 13 distributes a latest AM table to all host servers (i.e., the host servers 12a, 12b and 12c) in the shared storage system unlike embodiment will be described first. In this system, when network connection is temporarily interrupted, inconsistency in AM table content may occur between the host servers. Therefore, this system needs a mechanism (monitoring function) for, for example, regularly monitoring whether there is consistency in AM table content between the host servers.

In contrast, in the embodiment, when a host server accesses, for example, a logical unit LUi, the host server (more specifically, a storage device requested by the host server to access) determines whether a copy of the AM table 134_LUi associated with the logical unit LUi is latest. Accordingly, in the embodiment, it is not necessary to determine whether consistency exists in AM table content between host servers, even when a temporary interruption has occurred in network connection.

Figure 10:
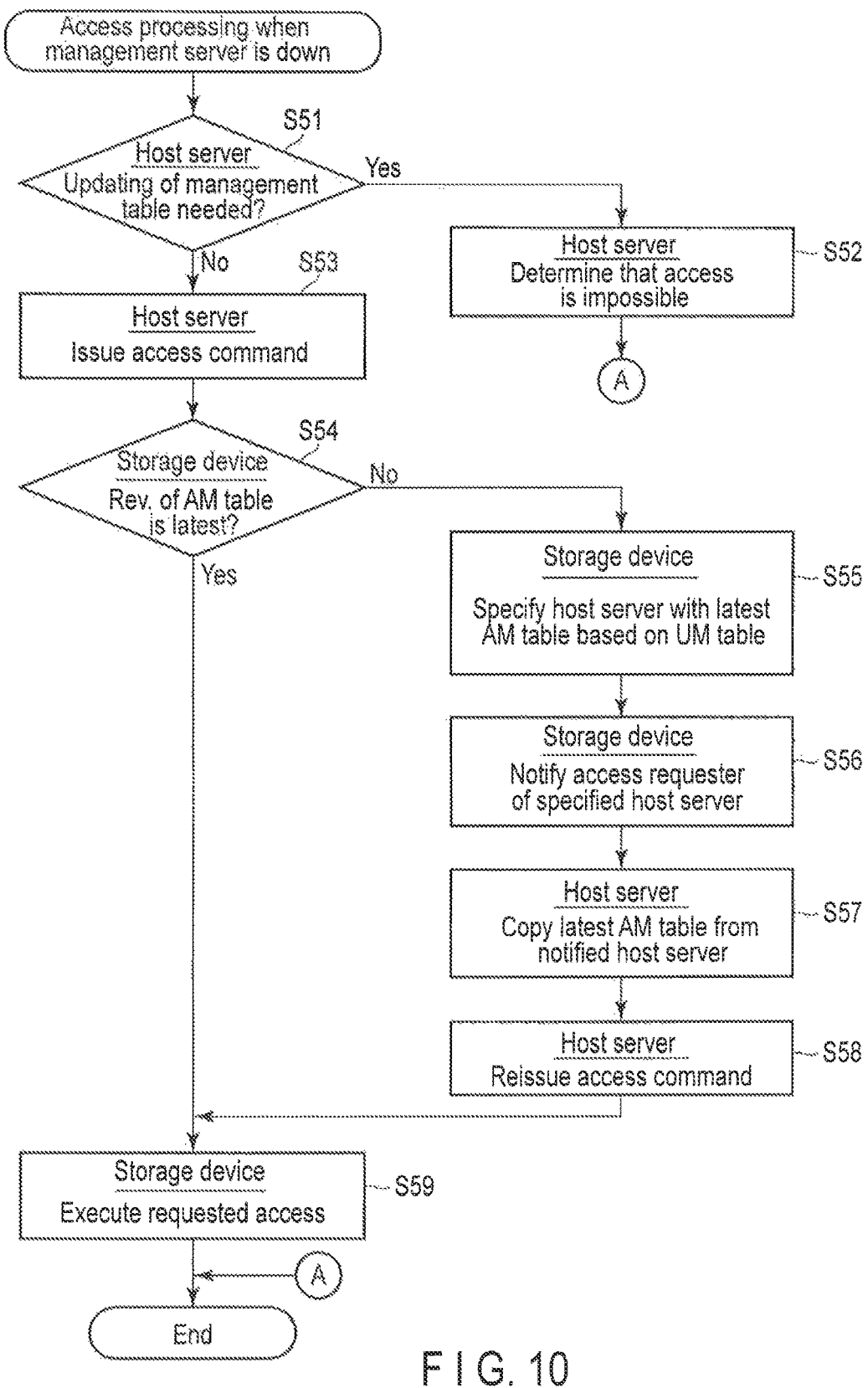
FIG. 10 is a flowchart showing an exemplary procedure of access processing performed in the embodiment when a management server is down.

Referring then to FIGS. 10 and 11, an operation performed when the management server is down will be described, using access processing as an example. FIG. 10 is a flowchart showing an exemplary procedure of access processing performed in the embodiment when the management server is down. FIG. 11 is a view for explaining the access processing performed when the management server is down.

Assume here that when the management server 13 is down, a request to access the logical unit LU0 or LU1 has occurred in the host server 12a. There are various conventional methods employed by each host server in a shared storage system to detect whether the management server 13 is down. Therefore, no description will be given of the detection method.

Firstly, the host server 12a determines whether the requested access needs updating of the AM table 134_LU0 or 134_LU1 (step S51). Access that needs updating of the AM table 134_LU0 or 134_LU1 is, for example, a write access to a new area in the logical unit LU0 or LU1. In this case (Yes in step S51), the host server 12a determines that access is impossible (step S52), whereby access processing is finished. Thus, when the management server 13 is down, the host server 12a determines that access needing updating of the AM table held by the management server 13 is impossible. The reason for this determination lies in that the AM table held by the management server 13 must be always latest.

In contrast, access that does not require updating of the AM table 134_LU0 or 134_LU1 is, for example, a read access, or a write access performed merely to change the existing data in the logical unit LU0 or LU1. The execution of such access is possible if the host server 12a holds a copy of the latest AM table 134_LU0 or 134_LU1 in the AM table 124a_LU0 or 124a_LU1.

Therefore, in the case of such access (No in step S51), the host server 12a generates an access command in accordance with the AM table 124a_LU0 or 124a_LU1 held therein, and issues it to a storage device (step S53). Assume here that the access command is issued to the storage device 11a. This access command includes the logical unit number LU0 or LU1 indicative of the logical unit LU0 or LU1. This access command also includes the revision number (RN) indicative of the revision of the AM table 124a_LU0 or 124a_LU1.

Upon receiving the access command from the host server 12a, the storage device 11a determines whether the revision of the AM table 124a_LU0 or 124a_LU1 held in the host server 12a is latest, as in step S13 (step S54). In other words, the storage device 11a compares the revision number included in the received access command with the revision number associated with the logical unit number LU0 or LU1 obtained from the UM table 110a. Based on the result of the comparison based on whether there is consistency or inconsistency in revision), the host server 12a determines whether the revision of the AM table 124a_LU0 or 124a_LU1 is latest.

In the example of FIG. 11, the revision numbers of the AM tables 124a_LU0 and 124a_LU1 are both 01. Further, the revision numbers, which are associated with the logical unit numbers LU0 and LU1 and indicated by the UM table 110a held in the storage device 11a, are 01 and 02, respectively. Namely, the revision numbers of the AM tables 134_LU0 and 134_LU1 are 01 and 02, respectively. Accordingly, in the example of FIG. 11, although the revision number of the AM table 124a_LU0 coincides with the revision number of the AM table 134_LU0, the revision number of the AM table 124a_LU1 does not coincide with the revision number of the AM table 134_LU1.

Assume here that the access command issued by the host server 12a commands access to the logical unit LU0. In this case, the revision number (01) of the AN table 124a_LU0 coincides with the revision number (01) of the AM table 134_LU0 as indicated by arrow A11 in FIG. 11. Namely, the revision number (01) of the AM table 124a_LU0 is latest (Yes in step S54). If a status associated with the execution of the received access command, which includes a revision consistency status, is good, the storage device 11a performs the access commanded by the received access command (step S59).

Assume further that the access command issued by the hest server 12a commands access to the logical unit LU1. In this case, the revision number (01) of the AM table 124a_LU1 does not coincide with the revision number (02) of the AM table 134_LU1 as indicated by arrow A12 in FIG. 11. Namely, the revision of the AM table 124a_LU1 is not latest (No in step S54). At this time, the storage device 11a notifies the host server 12a of an error status indicative of revision inconsistency in response to the access command from the host server 12a. If the host server 12a has been notified by the storage device 11a of the error status indicative of revision inconsistency when the management server 13 is down, it interrogates the storage device 11a for a host server that holds a copy of the latest AM table 134_LU1. The above operation performed when the revision of the AM table 124a LU1 is not latest is omitted in the flowchart of FIG. 10.

If the host server 11a has been notified of the error status indicative of revision inconsistency when it does not recognize that the management server 13 is down, it operates as follows: Firstly, the host server 12a attempts to obtain, from the management server 13, a copy of the latest AM table 134_LU1 associated with the logical unit LU1, as in step S7 or S20. In this case, however, since the management server 13 is down, the host server 12a fails in obtaining the copy of the latest AM table 134_LU1. As a result, the host server 12a recognizes that the management server 13 is down. Therefore, the host server 12a interrogates the storage device 11a for a host server that has a copy of the latest AM table 134_LU1.

In response to the above interrogation from the host server 12a, the storage device 11a specifies a host sever that has a copy of the latest AM table 134_LU1, as described below (step S55). Firstly, the storage device 11a obtains, from the UM table 110a, an updated server ID associated with the logical unit LU1, and specifies that the host server indicated by the obtained updated server ID is the host server having a copy of the latest AM table _34 LU1. It is assumed here that the host server 12b is specified.

Subsequently, the storage device 11a notifies the host server 12a of the ID of the specified host server 12b in response to the interrogation from the host server 12a (step S56). The host server 12a in turn obtains, from the notified host server 12b, copies of the latest AM table 124b_LU1 and the latest revision data 125b_LU1 associated with the logical unit LU1, as is indicated by arrow A13 in FIG. 11 (step S57). In step S57, the host server 12a updates the AM table 124a_LU1 and revision data 125a_LU1 based on the obtained copies. Namely, the host server 12a holds the copies of the AM table 124b_LU1 and revision data 125b_LU1 as the AM table 124a_LU1 and revision data 125a_LU1 that are copies of the latest AM table 134_LU1 and the latest revision data 135_LU1.

After that, the host server 12a regenerates an access command in accordance with the latest AM table 124a_LU1, and reissues the thus generated access command to the storage device 11a (step S58). The access command reissued by the host server 12a is received by the storage device 11a. If a status associated with the execution of the received access command, which includes a revision consistency status, is good, the storage device 11a performs an access operation designated by the received access command (step S59).

The storage device 11a may specify a host server having a copy of the latest AM table 134_LU1 before notifying the host server 12a of an error status indicative of revision inconsistency, and may notify the host server 12a of the specified host server (e.g., the host server 12b) using an error status indicative of revision inconsistency. At this time, if the host server 12a already recognizes that the management server 13 is down, it may obtain copies of the latest AM table 124b_LU1 and the latest revision data 125b_LU1 from the host server 12b. In contrast, if the management server 13 is not down, or if the host server 12a does not recognize that the management server 13 is down, it is sufficient if the host server 12a executes an operation of obtaining, from the management server 13, copies of the latest AM table 134_LU1 and the latest revision data 135_LU1.

In the embodiment, the storage device 11a manages, using the UM table 110a, the revision numbers of the latest AM tables associated with the respective logical units, and the IDs of the host servers that lastly updated the AM tables. Accordingly, when an access command including a logical unit number and a revision number is issued by the host server 12a to the storage device lie (step S53), the storage device 11a can determine whether the AM table held by the host server 12a is latest (step S54).

Further, if the AM table held by the host server 12a is not latest (No in step S54), the storage device 11a can specify a host server that has lastly updated the AM table, and notify the specified host server to the host server 12a (access requester) (steps S55 and S56). As a result, the host server 12a can obtain a copy of the latest AM table from the notified host server, and access a target logical unit based on the copy (steps S57 and S58).

In addition, the host servers 12a, 12b and 12c store the AM tables in nonvolatile storage devices, such as flash memories. Accordingly, the AM tables in the host servers 12a, 12b and 12c are protected from breakage due to interruption of power to the servers or due to rebooting thereof. Furthermore, in the host servers 12a, 12b and 12c, the AM tables may be stored in volatile storage devices, such as RAMs. In this case, the AM tables may be broken because of the above-mentioned power interruption or rebooting. However, when the storage devices 11a and 11b have received an access command from the host server 12a, 12b or 12c, they confirm whether the revision notified in the access command is the latest one. This prevents the storage devices 11a and 11b from accessing a wrong address.

In the flowchart shown in FIG. 10, after executing step S57, the host server 12a proceeds to step S58, thereby reissuing an access command. However, after executing step S57, the host server 12a may return to step S53 and reissue an access command.

In the at least one embodiment described above, although a plurality of host servers employ structures in which they have respective copies of address management information held in a management server, no special processing for making the address management information coincide between the host servers is needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shared storage system comprising:
a plurality of host servers;
a plurality of storage devices shared between the plurality of host servers;
a management server configured to provide the plurality of host servers with a plurality of logical units to which at least parts of storage areas of the plurality of storage devices are allocated; and
a switch configured to connect the plurality of host servers, the plurality of storage devices and the management server,
wherein
the management server is configured to:
    manage, for the respective logical units using first address management information, correspondences between virtual addresses in the respective logical units, real addresses in storage devices allocated to the virtual addresses, and storage identifiers indicative of the storage devices; and
    manage a revision of the first address management information for the respective logical units, using first revision data;
each of the plurality of host servers is configured to
    hold second address management information and second revision data that are copies of the first address management information and the first revision data corresponding to a logical unit included in the plurality of logical units, respectively;
    obtain, from the second address management information corresponding to a first logical unit, a first real address and a first storage identifier associated with a first virtual address in the first logical unit, when accessing the first virtual address; and
    request a storage device indicated by the first storage identifier to execute access, using a. first logical unit identifier indicative of the first logical unit, the first real address, and the second revision data corresponding to the first logical unit; and
each of the plurality of storage devices is configured to:
    hold updated management information including third revision data indicative of a revision of the first address management information notified by the management server in accordance with updating of the first address management information; and
    execute requested access based on the first real address on condition that at least the second revision data coincides with the third revision data corresponding to the first logical unit, when a first host server included in the plurality of host servers requests the access, using the first logical unit identifier, the first real address and the second revision data.

2. The shared storage system of claim 1, wherein:
the first host server is configured to notify the management server of necessity of updating of the first address management information corresponding to the first logical unit, when a request to a write access to the first logical unit occurs and the write access requires the updating;
the management server is further configured to:
  update the first address management information and the first revision data corresponding to the first logical unit, based on the notification of the necessity of the updating from the first host server; and
  at least notify a storage device that has a storage area allocated to the first logical unit, of the updating of the first address management information corresponding to the first logical unit;
the storage device notified of the updating by the management server is configured to update, based on the notification of the updating, the third revision data indicative of the revision of the first address management information that is included in the updated management information and corresponds to the first logical unit;
the management server is further configured to transmit respective copies of the updated first address management information and the updated first revision data to the first host server having notified the necessity of the updating; and
the first host server is configured to update the second address management information and the second revision data held by the first host server, based on the transmitted copies.

3. The shared storage system of claim 2, wherein:
a first storage device included in the plurality of storage devices is configured to notify the first host server of an error status indicative of revision inconsistency, when the second revision data does not coincide with the third revision data corresponding to the first logical unit; and
the first host server is further configured to:
  obtain, from the management server in accordance with the error status, respective copies of the first address management information and the first revision data corresponding to the first logical unit; and
  update the second address management information and the second revision data held by the first host server, based on the obtained copies.

4. The shared storage system of claim 3, wherein: the first host server is further configured to:
  obtain, from a second host server included in the plurality of host servers and holding latest second address management information corresponding to the first logical unit, respective copies of the latest second address management information and second revision data indicative of a revision of the latest second address management information, when the management server is malfunctioned; and
  update the second address management information and the second revision data held by the first host server, based on the copies.

5. The shared storage system of claim 4, wherein:
the management server is further configured to also notify a first host server identifier indicative of the first host server having notified the necessity of the updating, when notifying the updating of the first address management information corresponding to the first logical unit;
the updated management information held in each of the plurality of storage devices further includes a host server identifier associated with a logical unit to which a storage area of each of the plurality of storage devices is allocated, the host server identifier being indicative of a host server having notified of the updating of the corresponding first address management information;
the storage device notified of the updating is further configured to also update a host server identifier included in the updated management information and corresponding to the first logical unit, based on the notification of the updating; and
the first storage device is further configured to notify the first host server of the second host server holding the latest second address management information corresponding to the first logical unit, based on the updated management information.

6. The shared storage system of claim 5, wherein:
the first host server is further configured to interrogate the first storage device for a host server that holds The latest second address management information corresponding to the first logical unit, when having received, from the first storage device, the error status indicative of the revision inconsistency while the management server is malfunctioned; and
the first storage device is further configured to notify the first host server of the second host server in accordance with the interrogation from the first host server.

7. The shared storage system of claim 5, wherein the first storage device is further configured to notify the first host server of the second host server using an error status indicative of the revision inconsistency.

8. The shared storage system of claim 4, wherein the first host server is further configured to again request the first storage device to execute access, based on the updated second address management information and the updated second revision data, when having updated the second address management information and the second revision data.

9. A method for controlling access to a storage device in a shared storage system, the shared storage system comprising a plurality of host servers, a plurality of storage devices, a management server, and a switch, the plurality of storage devices being shared between the plurality of host servers, the management server being configured to provide the plurality of host servers with, a plurality of logical units to which at least parts of storage areas of the plurality of storage devices are allocated, the switch being configured to connect the plurality of host servers, the plurality of storage devices and the management server, the management server being configured to manage, for the respective logical units using first address management information, correspondences between virtual addresses in the respective logical units, real addresses in storage devices allocated to the virtual addresses, and storage identifiers indicative of the storage devices, the management server being further configured to manage a revision of the first address management information for the respective logical units, using first revision data, each of the plurality of host servers being configured to hold second address management information and second revision data that are copies of the first address management information and the first revision data corresponding to a logical unit included in the plurality of logical units, respectively, each of the plurality of storage devices being configured to hold updated management information including third revision data indicative of a revision of the first address management information notified by the management server in accordance with updating of the first address management information, the method comprising causing a first host server included in the plurality of host servers to obtain, from the second address management information corresponding to a first logical unit, a first real address and a first storage identifier associated with a first virtual address in the first logical unit, when the first host server accesses the first virtual address;

causing the first host server to request a first storage device, included in. the plurality of storage devices and indicated by the first storage identifier, to execute access, using a first, logical unit identifier indicative of the first logical unit, the first real address, and the second revision data corresponding to the first logical unit; and causing the first storage device to execute the requested access based on the first real address on condition that at least the second revision data coincides with the third revision data corresponding to the first logical unit, when the first host server requests the access, using the first logical unit identifier, the first real address and the second revision data.

10. The method of claim 9, further comprising causing the first host server to notify the management server of necessity of updating of the first address management information corresponding to the first logical unit, when a request to a write access to the first logical, unit occurs and the write access requires the updating;

causing the management server to update the first address management information and the first revision data corresponding to the first logical unit, based on the notification of the necessity of the updating from the first host server;

causing the management server to at least notify a storage device that has a storage area allocated to the first logical unit, of the updating of the first address management information corresponding to the first logical unit;

causing the storage device notified of the updating by the management server to update, based on the notification of the updating, the third revision data indicative of the revision of the first address management information that is included in the updated management information and corresponds to the first logical unit;

causing the management server to transmit respective copies of the updated first address management information and the updated first revision data to the first host server having notified the necessity of the updating; and causing the first host server to update the second address management information and the second revision. data held by the first host server, based on the transmitted copies.

11. The method of claim 10, further comprising:

causing the first storage device to notify the first host server of an error status indicative of revision inconsistency, when the second revision data does not coincide with the third revision data corresponding to the first logical unit;

causing the first host server to obtain, from the management server in accordance with the error status, respective copies of the first address management information and the first revision data corresponding to the first logical unit; and causing the first host server to update the second address management information and the second revision data held by the first host server, based on the obtained copies.

12. The method of claim 11, further comprising:

causing the first host server to obtain, from a second host server included in the plurality of host servers and holding latest second address management information corresponding to the first logical unit, respective copies of the latest second address management information and second revision data indicative of a revision of the latest second address management information, when the management server is malfunctioned; and causing the first host server to update the second address management information and the second revision data held by the first host server, based on the copies.

13. The method of claim 12, further comprising causing the management server to also notify a first host server identifier indicative of the first host server having notified the necessity of the updating, when the updating of the first address management information corresponding to the first logical unit is notified, wherein:

the updated management information held in each of the plurality of storage devices further includes a host server identifier associated with a logical unit to which a storage area of each of the plurality of storage devices is allocated, the host server identifier being indicative of a host server having notified of the updating of the corresponding first address management information; and the method further comprises causing the storage device notified of the updating to also update a host server identifier included in the updated management information and corresponding to the first logical unit, based on the notification of the updating; and causing the first storage device to notify the first host server of the second host server holding the latest second address management information corresponding to the first logical unit, based on the updated management information.

14. The method of claim 13, further comprising:

causing the first host server to interrogate the first storage device for a host server that holds the latest second address management information corresponding to the first logical unit, when the first host server has received, from the first storage device, the error status indicative of the revision inconsistency while the management server is malfunctioned; and causing the first storage device to notify the first host server of the second host server in accordance with the interrogation from the first host server.

15. The method of claim 13, wherein the first host server is notified of the second host server using an error status indicative of the revision inconsistency.

16. The method of claim 12, further comprising causing the first host server to again request the first storage device to execute access, based on the updated second address management information and the updated second revision data, when the second address management information and the second revision data has been updated.

* * * * *

UNITED STATES PATENT AND TRADEMARK OFFICE
CERTIFICATE OF CORRECTION

PATENT NO. : 9,684,577 B2  Page 1 of 1
APPLICATION NO. : 14/608247
DATED : June 20, 2017
INVENTOR(S) : Kimiaki Ishii It is certified that error appears in the above-identified patent and that said Letters Patent is hereby corrected as shown below:

In the Claims

Claim 1, Column 18, Line 51, change "a." to --a--.

Claim 6, Column 20, Line 20, change "holds The" to --holds the--.

Claim 9, Column 21, Line 10, change "in." to --in--.

Claim 10, Column 21, Line 28, change "logical, unit" to --logical unit--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*